(12) United States Patent
Gilchrist, Jr.

(10) Patent No.: US 7,482,579 B2
(45) Date of Patent: Jan. 27, 2009

(54) METHOD AND APPARATUS FOR HIGH RESOLUTION GAMMA RAY MEASUREMENTS

(75) Inventor: W. Allen Gilchrist, Jr., Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/686,442

(22) Filed: Mar. 15, 2007

(65) Prior Publication Data

US 2008/0224031 A1    Sep. 18, 2008

(51) Int. Cl.
    *G01V 5/06*      (2006.01)
(52) U.S. Cl. .................. 250/265; 250/266; 250/264
(58) Field of Classification Search ............ 250/265, 250/266, 264, 394
See application file for complete search history.

(56) References Cited

U.S. PATENT DOCUMENTS

| | | | |
|---|---|---|---|
| 2,481,014 A * | 9/1949 | Herzog | 250/264 |
| 2,522,522 A * | 9/1950 | Krasnow | 250/267 |
| 5,459,314 A | 10/1995 | Plasek | |
| 6,666,285 B2 | 12/2003 | Jones et al. | |
| 2005/0199794 A1 | 9/2005 | Mickael | |
| 2006/0192095 A1 | 8/2006 | Stoller et al. | |

* cited by examiner

*Primary Examiner*—Constantine Hannaher
(74) *Attorney, Agent, or Firm*—Cantor Colburn LLP

(57) ABSTRACT

A method for measuring radiation, the method includes selecting at least two radiation detectors, each detector having a spatial resolution that differs from the spatial resolution of other detectors; measuring the radiation with the detectors; and combining a response from at least two of the detectors to produce a composite response exhibiting a spatial resolution.

22 Claims, 10 Drawing Sheets

```
┌─────────────────────────────────────┐
│  Select At Least Two Gamma Radiation │
│   Detectors With Spatial Resolutions │
│     Different From Each Other- 91    │
└─────────────────────────────────────┘
                  │
                  ▼
┌─────────────────────────────────────┐
│   Measure Gamma Radiation With The   │
│           Detectors - 92             │
└─────────────────────────────────────┘      } 90
                  │
                  ▼
┌─────────────────────────────────────┐
│ Combine A Response From At Least Two │
│  Of The Gamma Radiation Detectors To │
│ Provide A Composite Response Exhibiting │
│       A Spatial Resolution - 93      │
└─────────────────────────────────────┘
```

METHOD AND APPARATUS FOR HIGH RESOLUTION GAMMA RAY MEASUREMENTS

BACKGROUND OF THE INVENTION

1. Field of the Invention

This invention relates to measuring natural gamma radiation from a subsurface formation. In particular, the measuring is performed within a borehole.

2. Description of the Related Art

Geologic formations below the surface of the earth may contain reservoirs of oil and gas. Measuring properties of the geologic formations provides information that can be useful for locating the reservoirs of oil and gas. Typically, the oil and gas are retrieved by drilling boreholes into the subsurface of the earth. The boreholes also provide access to take measurements of the geologic formations.

Well logging is a technique used to take measurements of the geologic formations from the boreholes. In one embodiment, a "logging instrument" is lowered on the end of a wireline into the borehole. The logging instrument sends data via the wireline to the surface for recording. One type of measurement involves measuring naturally occurring gamma radiation (or gamma rays) from the geologic formations.

The geologic formations may include formation bedding planes. In a quest for oil and gas, it is important to know about the location and composition of the formation bedding planes. In particular, it is important to know about the formation bedding planes with a high degree of accuracy so that drilling time is not wasted.

Measuring naturally occurring gamma radiation is one way to determine characteristics of the formation bedding planes. A gamma radiation detector may be used as a component of the logging instrument to measure the naturally occurring radiation. Typically, the gamma radiation detector is cylindrically shaped and has a certain length. In typical embodiments, scintillator materials are used for gamma radiation detection.

A gamma ray entering the gamma radiation detector will cause an output of an electrical signal. Gamma rays may enter the gamma radiation detector from any angle. As long as a gamma ray enters the gamma radiation detector, the gamma radiation detector will output an electrical signal regardless of the angle of entry. As the gamma radiation detector moves along the borehole, gamma rays from the formation bedding planes will enter the gamma radiation detector and be detected.

One skilled in the art will recognize that various shapes and forms of gamma radiation detectors will provide various types of information about the formation bedding planes. As one may imagine, a cylindrically shaped gamma radiation detector may provide more opportunities for gamma rays to enter as the gamma radiation detector moves by the formation bedding planes. On the other hand, if the gamma radiation detector was, hypothetically, only a point, there would be fewer opportunities for gamma rays to enter as the gamma radiation detector moves by the formation bedding planes. A point gamma radiation detector can detect changes in radiation as the detector moves through the borehole with better spatial resolution than the cylindrically shaped gamma radiation detector. Less spatial resolution with cylindrically shaped gamma radiation detectors will result in less accurate knowledge of the formation bedding planes.

What are needed are an apparatus and a method for melting measurements of natural gamma radiation of a subsurface formation from a borehole with improved spatial resolution along the axis of the borehole.

BRIEF SUMMARY OF THE INVENTION

The shortcomings of the prior art are overcome and additional advantages are provided through a method for measuring radiation, the method includes selecting at least two radiation detectors, each detector having a spatial resolution that differs from the spatial resolution of the other detectors; measuring the radiation with the detectors; and combining a response from at least two of the detectors to produce a composite response exhibiting a spatial resolution.

Also disclosed is an instrument including at least two radiation detectors, wherein each detector has a spatial resolution that differs from the spatial resolution of the other detectors in the instrument, coupled to a device for at least one of storing and combining a response from each of the at least two detectors to produce a composite response, the composite response exhibiting a spatial resolution.

Also disclosed is a computer program product stored on machine-readable media, the product includes instructions for measuring radiation, the instructions include instructions for measuring radiation with at least two radiation detectors, each detector comprising a spatial resolution that differs from the spatial resolution of the other detectors; and combining a response from each detector to produce at least one composite response exhibiting a spatial resolution.

Further disclosed is a method for producing a radiation detector for a logging instrument, the method includes selecting at least two radiation detectors, each detector having a spatial resolution; and shielding at least one of the detectors to differentiate the spatial resolution of the detector from the spatial resolution of the other detectors.

BRIEF DESCRIPTION OF THE DRAWINGS

Referring now to the drawings wherein like elements are numbered alike in the several Figures.

DETAILED DESCRIPTION OF THE INVENTION

Figure 1:
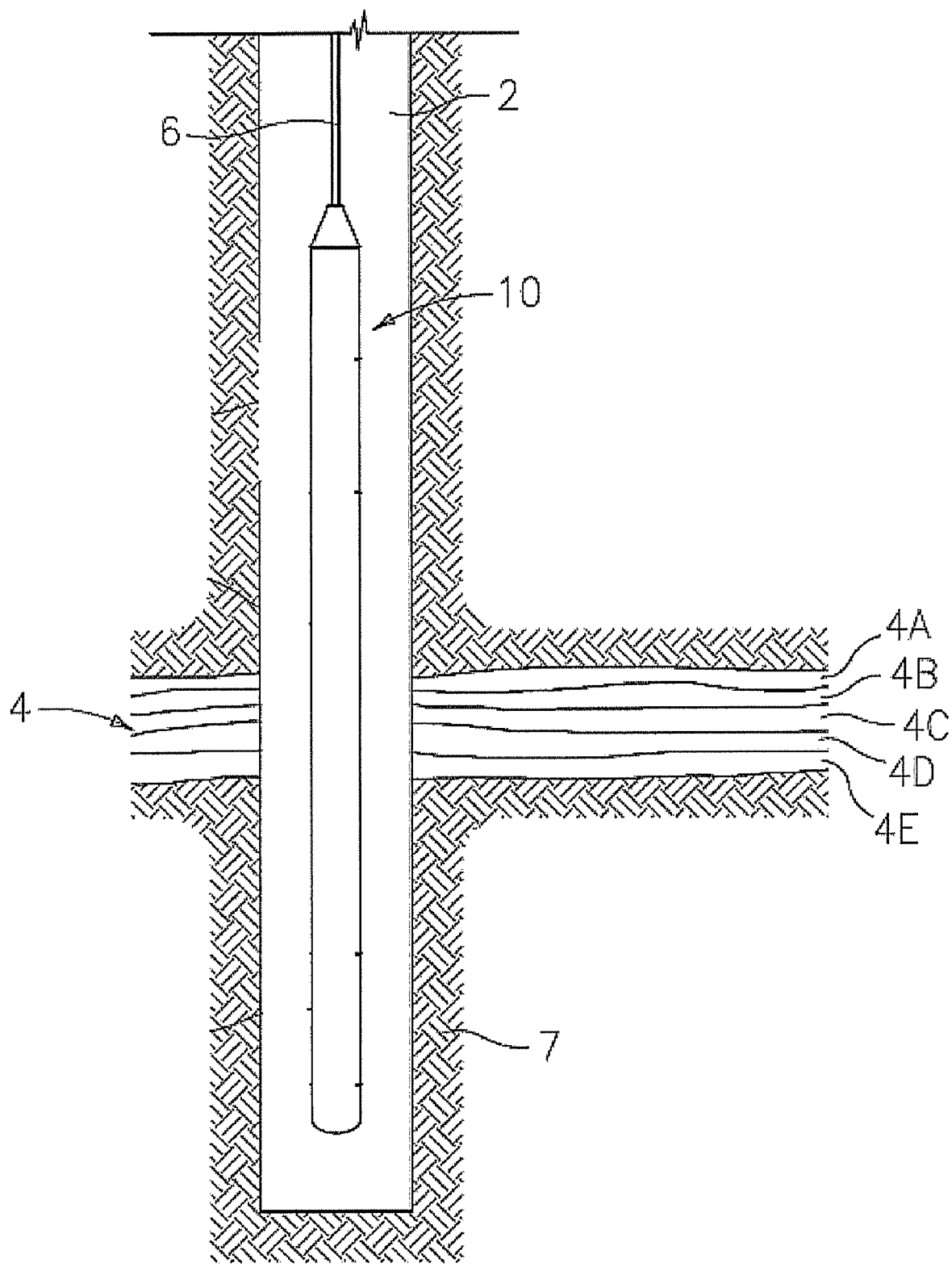
FIG. 1 illustrates an exemplary embodiment of a logging instrument in a borehole penetrating the earth.

Referring to FIG. 1, a well logging instrument 10 is shown disposed in a borehole 2. The borehole 2 is drilled through earth 7 and penetrates formations 4, which include various formation bedding planes 4A-4E. The logging instrument 10 is typically lowered into and withdrawn from the borehole 2 by use of an armored electrical cable 6 or similar conveyance as is known in the art.

In typical embodiments, the borehole 2 includes materials such as would be found in oil exploration, including a mixture of liquids such as water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

The teachings provide for making measurements of natural gamma radiation emitted from the formation 4. The measurements are performed in a borehole 2 and provide improved spatial resolution. The measurements call for using an instrument 10 having two or more gamma radiation detectors each detector having an associated spatial resolution. In a typical embodiment, a first detector is unshielded. The first detector provides a first response. A second detector is partially shielded by shielding. The second detector provides a second response that, because of the shielding, is different from the first response. The first response and the second response may be combined to provide a composite response in such a way that the composite response has increased spatial resolution over the first and second responses individually. Before the logging instrument 10 and methods are discussed in detail, certain definitions are provided.

Figure 2:
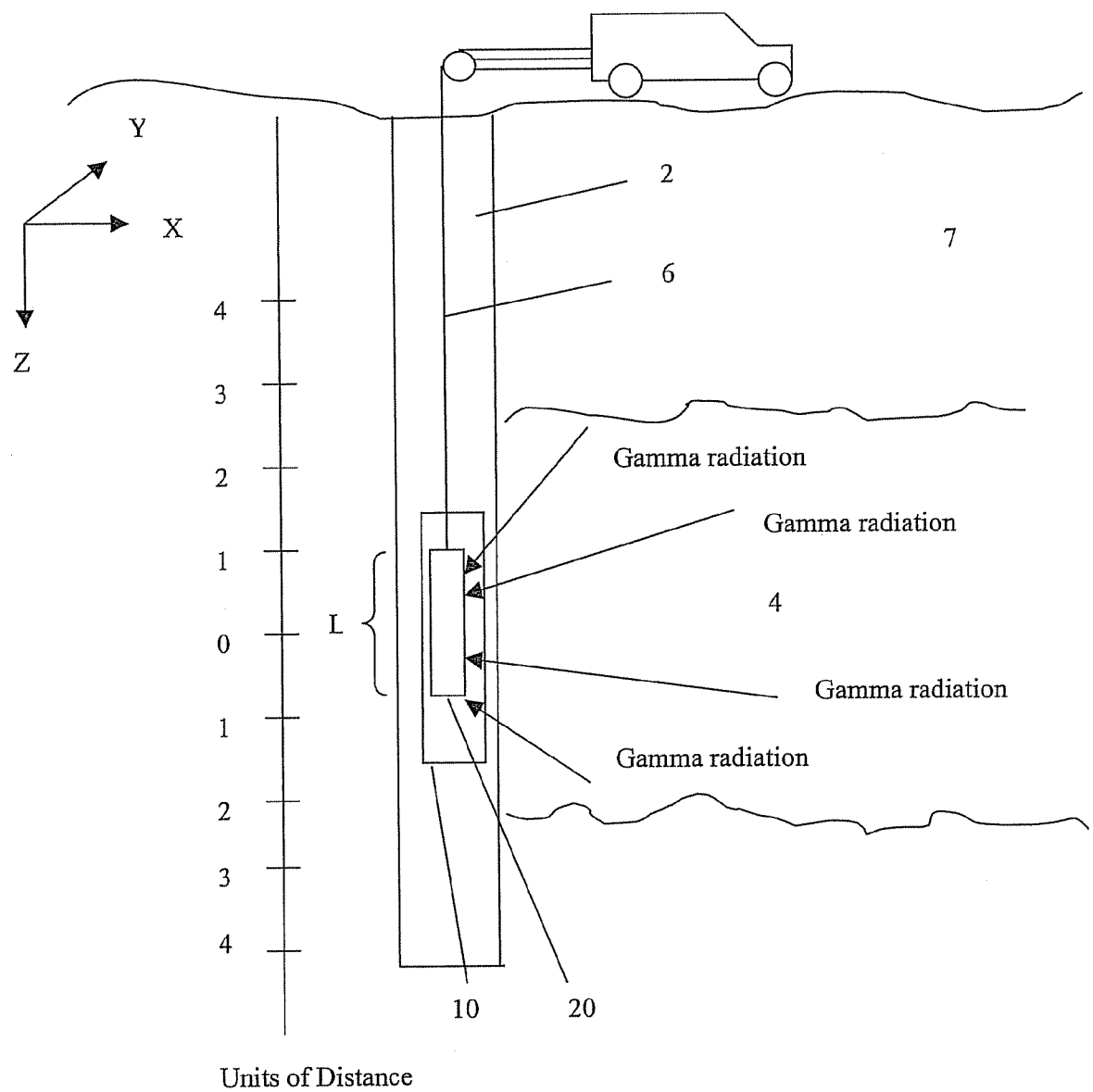
FIG. 2 illustrates spatial resolution for the logging instrument.

The term "spatial resolution" relates to a detector's ability to resolve radiation along a length of the detector. This is typically applied to measurements as the detector moves through the borehole 2. Referring to FIG. 2, a gamma radiation detector 20 (referred to as detector 20) included in the logging instrument 10 has a given "spatial resolution" for detection of gamma radiation from the formation 4. As shown in FIG. 2, an axis of the borehole 2 is aligned in the Z-direction. Parameters that affect spatial resolution of the detector 20 include a length, L, a speed at which the logging instrument 10 traverses the borehole 2, counting efficiency, detector 20 volume, scintillator type, voltage, and others as may be known in the art. The spatial resolution of the detector 20 relates to the degree to which the detector 20 can resolve changes in gamma radiation as the detector 20 traverses the borehole 2. The term "full-width half-maximum" (FWHMM) relates to a measurement for spatial resolution. The FWHM of a gamma radiation detector is a width between two points on a response curve where the two points are at half the maximum value of the response curve. In general, a higher spatial resolution will result in a lower FWHM. The term "gamma radiation detector" relates to any detector designed to detect gamma radiation and suited for use in the instrument 10. One example of the gamma radiation detector 20 is a scintillation detector. The term "logging while drilling" (LWD) relates to measuring geological parameters from the borehole 2 while drilling is talking place. The term "placement geometry" relates to an orientation to which the detector 20 may be placed in the logging instrument 10. In general, the placement geometry of the detector 20 may affect the spatial resolution of the detector 20.

For the purposes of this discussion, it is assumed that the borehole 2 is vertical and that the formations 4 are horizontal. Thus the spatial resolution along the borehole may be referred to as "vertical resolution." The apparatus and method however can be applied equally well in deviated or horizontal wells or with the formation bedding planes 4A-4E at any arbitrary angle. The apparatus and method are equally suited for use in LWD applications and in open-borehole and cased-borehole wireline applications. In LWD applications, the apparatus may be disposed in a drilling collar. Additionally, the logging instrument 10 and method can be applied to total gamma radiation measurements and to measurements of gamma ray energy spectra.

Figure 3:
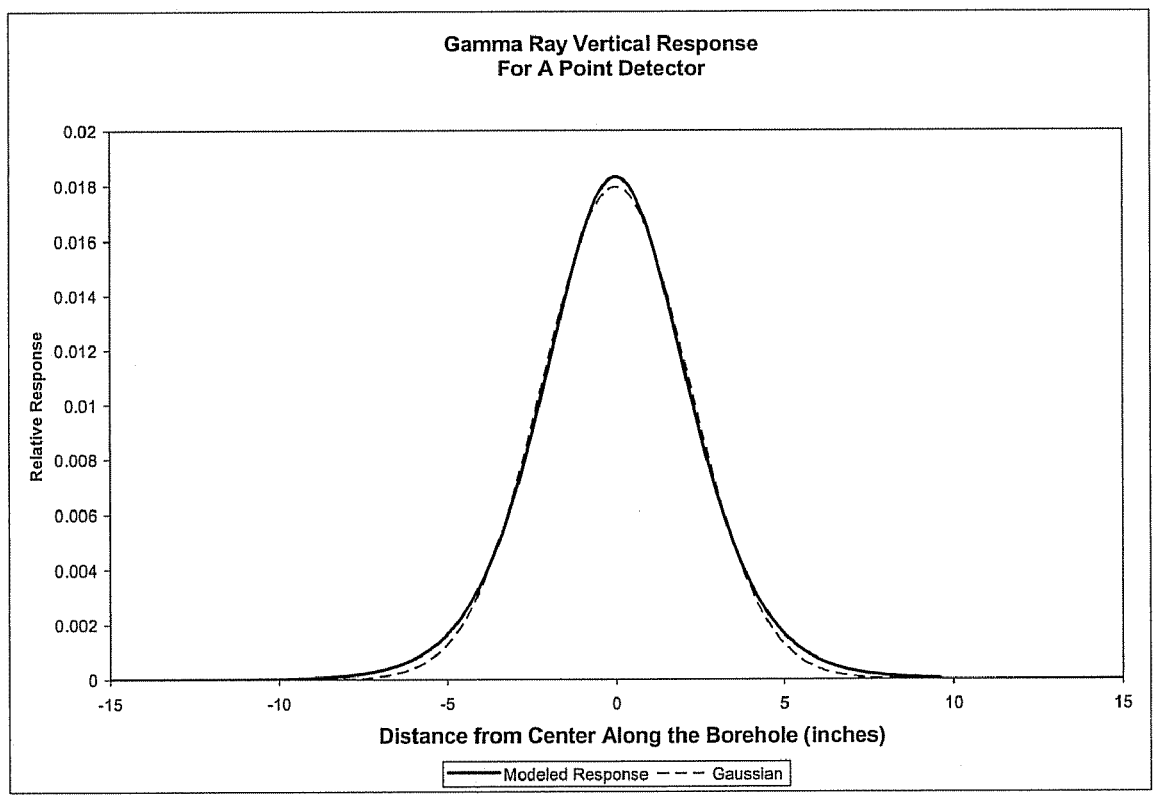
FIG. 3 illustrates a graph of an exemplary response of a hypothetical gamma radiation point detector to gamma radiation along an axis of a borehole.

FIG. 3 illustrates a graph of an exemplary response of a hypothetical gamma radiation point detector to gamma radiation along an axis of the borehole 2 in a water-filled environment. A Gaussian curve that is a best least-squares fit to the response is also shown. In general, the Gaussian curve is used to develop a detector response curve from detector response data. The hypothetical gamma radiation point detector has a FWHM value of about five inches. The hypothetical gamma radiation point detector has a vertical resolution with a finite lower limit due to transport properties of gamma rays in the subsurface formation 4 and the borehole 2. An exact FVHM value depends on exact properties of the subsurface formation 4 and a fluid in the borehole 2.

Figure 4:
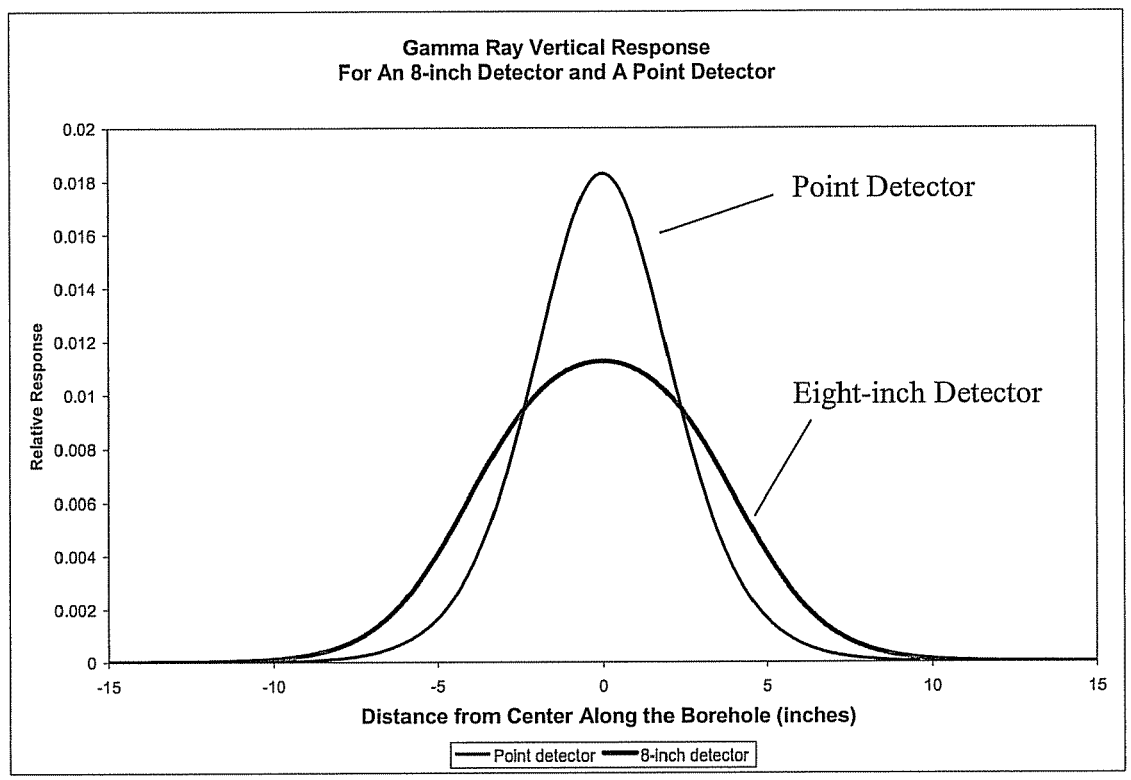
FIG. 4 illustrates a graph of exemplary responses of the hypothetical gamma radiation point detector and an eight-inch gamma radiation detector to gamma radiation along the axis of the borehole.

FIG. 4 illustrates a graph of exemplary responses of the hypothetical gamma radiation point detector and an eight-inch gamma radiation detector to gamma radiation along the axis of the borehole 2. The responses are normalized so that an area under each curve is one. The FWHM value for the response from the eight-inch detector is about 8.6 inches. As above, the exact FWHM value depends on the exact properties of the subsurface formation 4 and the fluid in the borehole 2.

Figure 5:
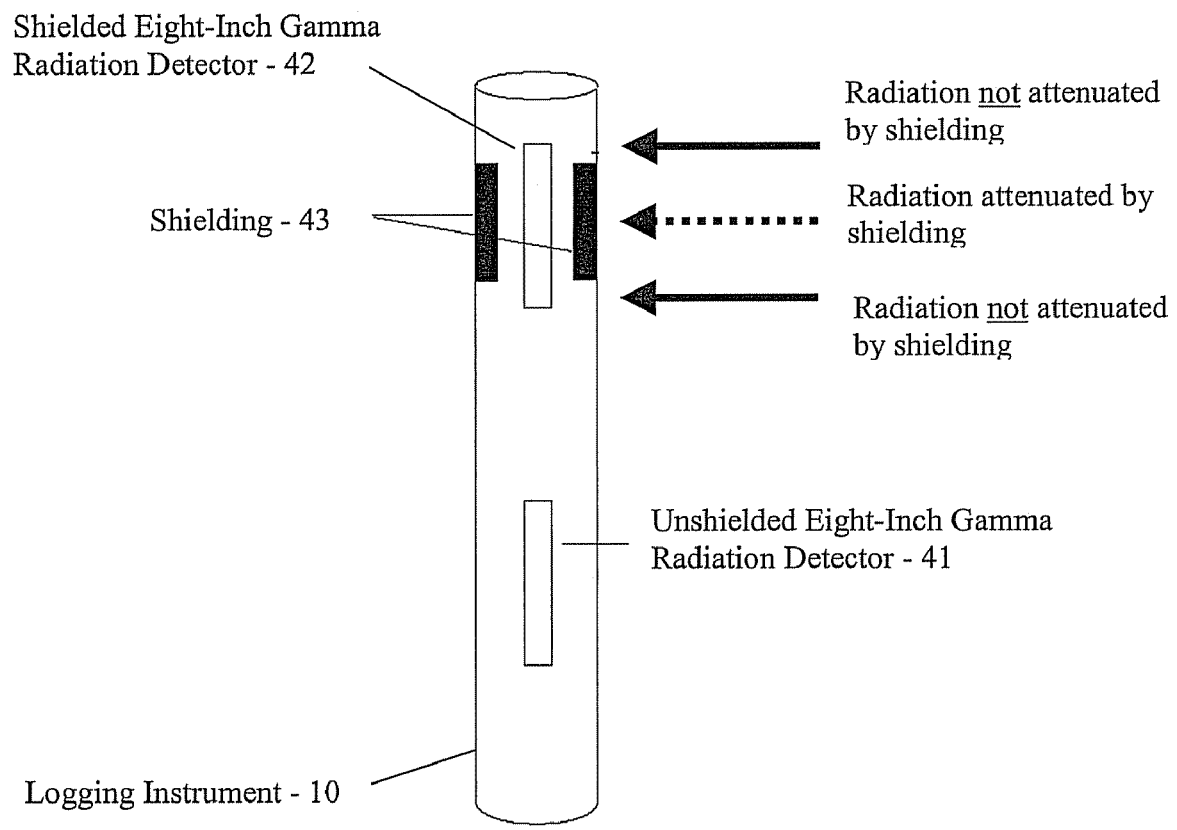
FIG. 5 illustrates an exemplary embodiment of the logging instrument that includes an unshielded eight-inch gamma radiation detector and a shielded eight-inch gamma radiation detector.

Consider a logging instrument for measuring gamma radiation with multiple gamma radiation detectors 20. Each gamma radiation detector 20 may have different types of shielding so that the vertical resolution of each gamma radiation detector 20 is different. FIG. 5 illustrates an exemplary embodiment of the logging instrument 10 that includes an unshielded eight-inch gamma radiation detector 41 and a shielded eight-inch gamma radiation detector 42 shielded by shielding 43. A size, thickness, and placement for the shielding 43 may be selected based on a specific application and size of the instrument 10. An only requirement is that the shielding 43 provide a vertical resolution for the shielded eight-inch gamma radiation detector 42 that is different from the vertical resolution of the unshielded eight-inch gamma radiation detector 41.

Figure 6:
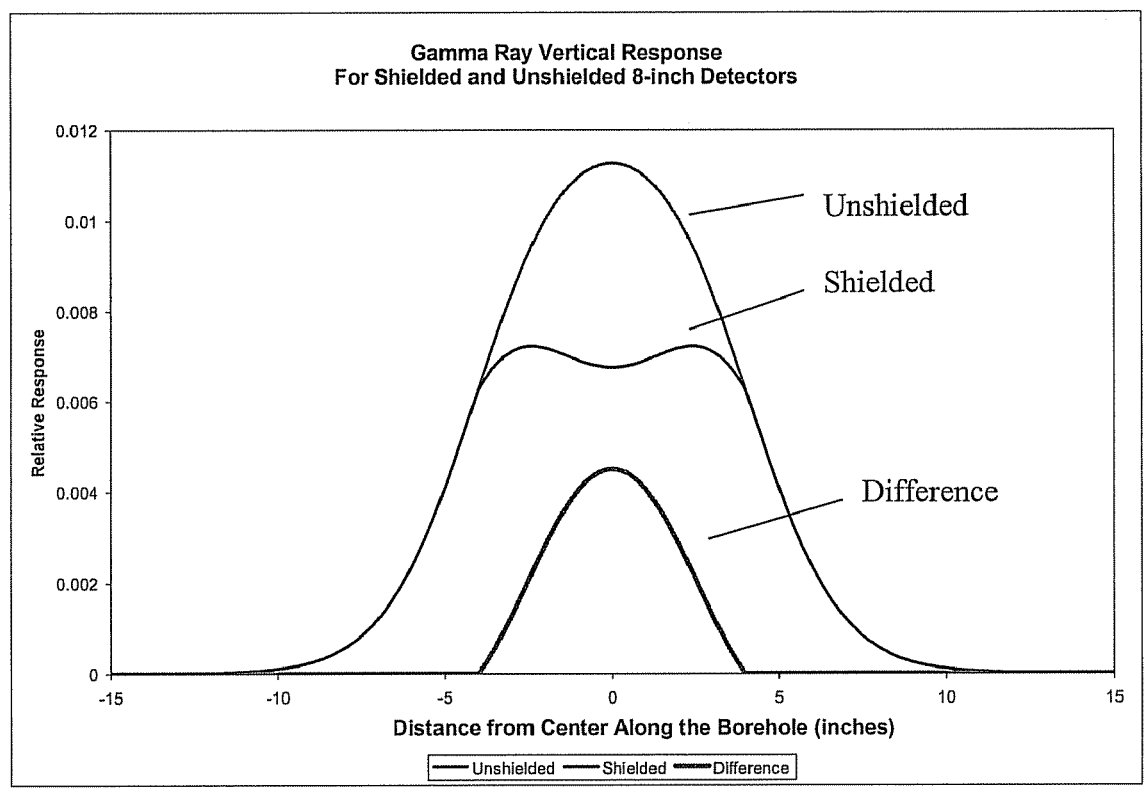
FIG. 6 illustrates a graph of exemplary responses of the an unshielded eight-inch gamma radiation detector and a shielded eight-inch gamma radiation detector to gamma radiation along the axis of the borehole.

A vertical response of the shielded eight-inch gamma radiation detector 42 in FIG. 5 is similar to that of the unshielded eight-inch gamma radiation detector 41 to portions of the formations 4 at large distances along the borehole 2. The vertical response to portions of the formations 4 near the shielded eight-inch gamma radiation detector 42 is, however, reduced. FIG. 6 illustrates a graph of exemplary responses of the unshielded eight-inch gamma radiation detector 41 and the shielded eight-inch gamma radiation detector 42 to gamma radiation along the axis of the borehole 2 in addition to a curve of a difference between the responses (referred to as a differential response). The response of the shielded eight-inch gamma radiation detector 42 (referred to as detector 42) has a bimodal shape due to the shielding 43 attenuating radiation at a center portion of the detector 42. The shielding 43 does not attenuate the radiation entering unshielded ends of the detector 42. Therefore, the responses due to radiation entering the unshielded ends of the detector 42 are greater than the response of radiation entering the center portion of the detector 42. As the detector 42 traverses the formation 4, radiation will be detected first with a high response due to the radiation entering a first unshielded end of the detector 42. The response will then decrease as the shielding 43 attenuates the radiation to the center portion of the detector 42. Finally, the response will increase as a second unshielded end of the detector 42 traverses the formation 4.

The differential response demonstrates a significant improvement in vertical resolution with a FWHM value of about 4.8 inches as compared to 8.6 inches for the unshielded eight-inch gamma radiation detector 41. A total number of counts related to the differential response is also reduced. The reduced total number of counts may result in a significant loss of statistical precision in the measurement. It is possible, however, to combine a higher resolution but poorer precision measurement with a lower resolution higher precision measurement (i.e., using one of the unshielded eight-inch gamma radiation detector 41 and the shielded eight-inch gamma radiation detector 42) using Enhance processing made commercially available by Baker Hughes Incorporated of Houston, Tex. In general, the Enhance processing uses statistical algorithms to combine data from different detectors into one output response curve. For example, a sum of counts from the unshielded eight-inch gamma radiation detector 41 and the shielded eight-inch gamma radiation detector 42 may be used as an even higher precision measurement with the Enhance processing. Typically with the Enhance processing, characteristics of each input response curve may be selected to be included in the output response curve. In this manner, desirable features of the input response curves may be optimized in the output response curve.

Figure 7:
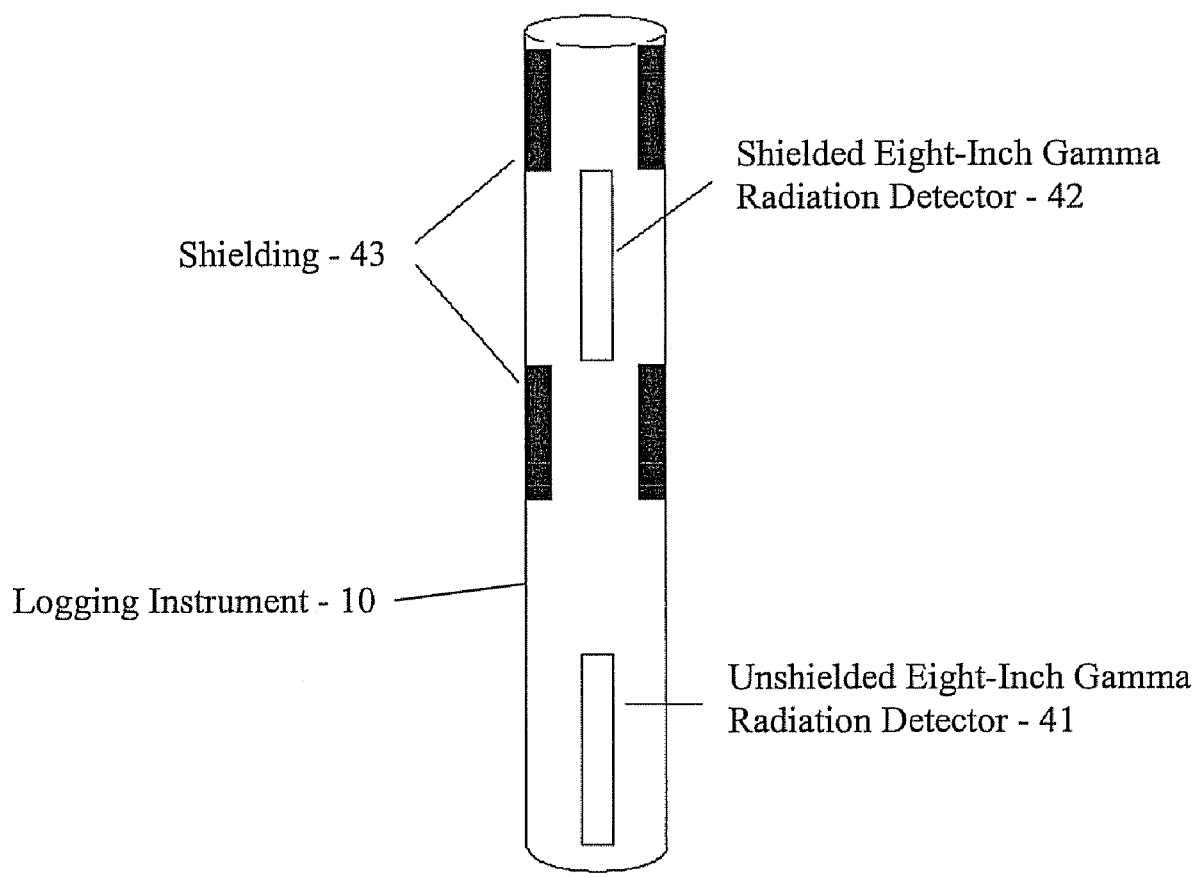
FIG. 7 illustrates an exemplary embodiment of the logging instrument with another shielding arrangement.

Other configurations of the shielding 43 are possible. FIG. 7 illustrates an exemplary embodiment of the logging instrument 10 with another configuration of the shielding 43. The shielding 43 in FIG. 7 provides for improved vertical resolution of the shielded eight-inch gamma radiation detector 42.

The logging instrument 10 discussed above may be produced with at least two of any gamma radiation detectors 20 with different vertical resolutions. The different vertical resolutions may be provided by different configurations of the shielding 43. For example, the logging instrument 10 may be fabricated with one unshielded eight-inch gamma radiation detector 41 and two shielded eight-inch gamma radiation detectors 42 with the shielding 43 configured similar to the shielding 43 shown in FIGS. 5 and 7. This logging instrument 10 may be used to provide superior precision and vertical resolution.

Figure 11:
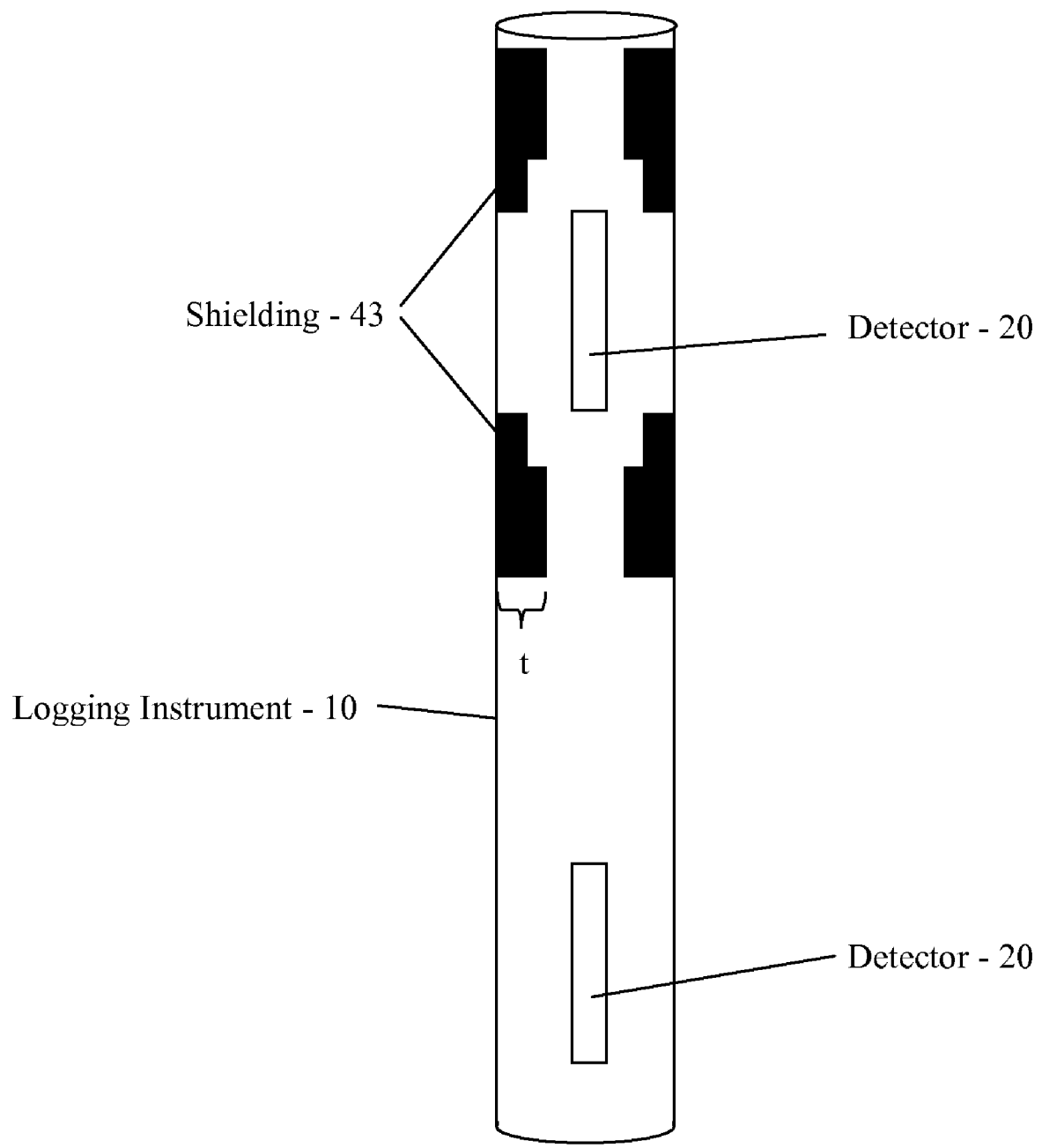
FIG. 11 illustrates an exemplary embodiment of shielding with non-uniform thickness shielding one gamma radiation detector.

In another embodiment, the logging instrument 10 may include a gamma radiation detector 20 shielded by the shielding 43 of a variable thickness. The variable thickness of the shielding 43 may provide for a certain spatial resolution for resolving changes in gamma radiation as the detector 20 traverses the borehole 2. In this embodiment, certain advantages may be had. For example, the gamma radiation detector 20 may be shielded so as to produce a flat response curve for the length of the detector 20. FIG. 11 illustrates the shielding 43 with a thickness (t) that is variable (i.e., non-uniform). In FIG. 11, the shielding 43 with non-uniform thickness shields one gamma radiation detector 20.

Typically, the well logging instrument 10 includes adaptations as may be necessary to provide for operation during drilling or after a drilling process has been undertaken.

Figure 8:
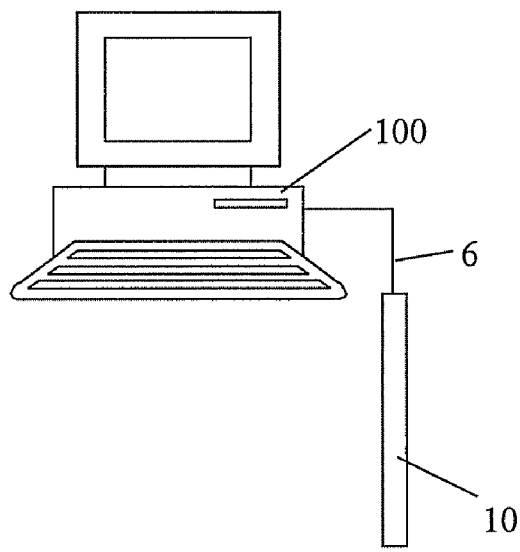
FIG. 8 illustrates an exemplary embodiment of a computer coupled to the logging instrument.

Referring to FIG. 8, an apparatus for implementing the teachings herein is depicted. In FIG. 8, the apparatus includes a computer 100 coupled to the well logging instrument 10. Typically, the computer 100 includes components as necessary to provide for the real time processing of data from the well logging instrument 10. Exemplary components include, without limitation, at least one processor, storage, memory, input devices, output devices and the like. As these components are known to those skilled in the art, these are neither depicted in any detail nor discussed further herein.

Typically, the teachings herein are reduced to an algorithm that is stored on machine-readable media. The algorithm is implemented by the computer 100 and provides operators with desired output. The output is typically generated on a real-time basis.

As used herein, generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

In one exemplary embodiment, responses from two gamma radiation detectors 20 with differing spatial resolutions may be combined to produce a composite response. The composite response may be produced by subtracting one response from another response. Typically, the composite response produced by the subtracting will demonstrate a higher spatial resolution than the spatial resolution of the other responses individually. Alternatively for applications that require a broad response, the responses from the two gamma radiation detectors 20 may be combined using mathematical operations to produce a composite response that has less spatial resolution than the spatial resolution of the other responses individually. Finally for applications that require a pre-determined spatial resolution, the responses from the two gamma radiation detectors 20 may be combined to produce a composite response that has the predetermined resolution spatial resolution. In general, a composite response with a spatial resolution from a continuum of spatial resolutions may be obtained from the responses. The continuum may extend from a broad spatial resolution that is less than the spatial resolution of the responses to a high spatial resolution that exceeds the spatial resolution of the responses. Generally, the Enhance processing may be used for the combining.

Figure 9:
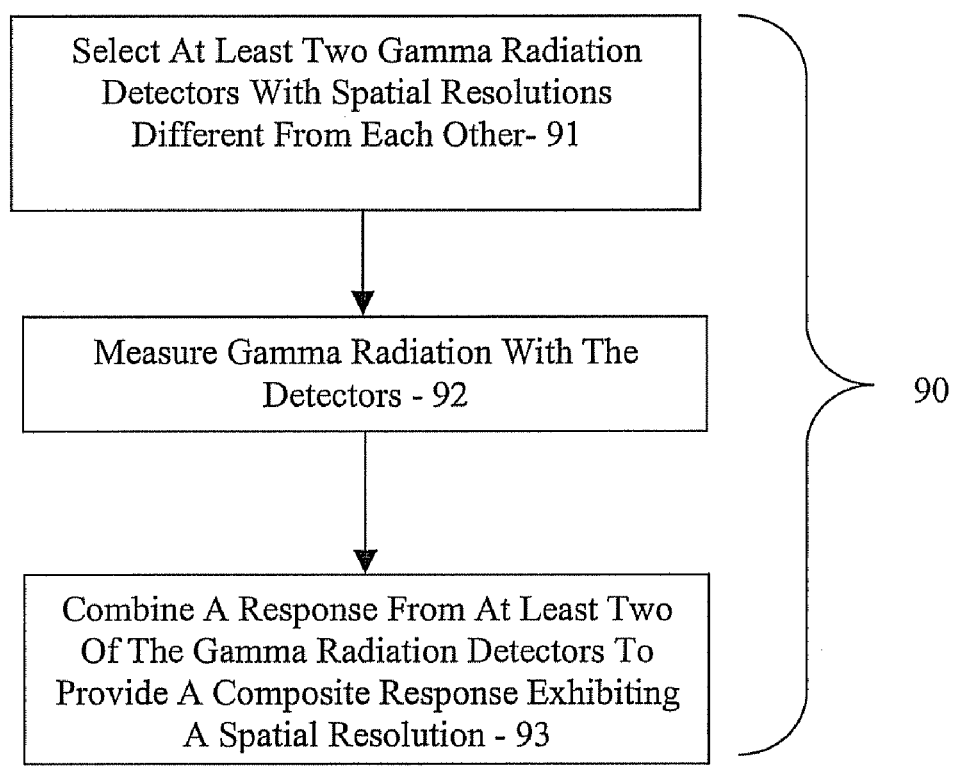
FIG. 9 illustrates an exemplary method for measuring gamma radiation along the axis of the borehole with increased spatial resolution.

FIG. 9 presents an exemplary method 90 for measuring gamma radiation. A first step 91 calls for selecting at least two gamma radiation detectors 20 with spatial resolutions different from each other. For example, one of the gamma radiation detectors 20 may be the unshielded eight-inch gamma radiation detector 41 and the other may be the shielded eight-inch gamma radiation detector 42 that is shielded by the shielding 43. The detectors 20 with differing spatial resolutions may be provided by the detectors 20 with different geometries. The differing spatial resolutions may also be provided by placing in the instrument 10 one of the selected detectors 20 with a placement geometry different from the placement geometries of the other detectors 20. A second step 92 calls for measuring the gamma radiation with the detectors 20. The second step 92 may be performed either as wireline logging or as logging while drilling. A third step 93 calls for combining a response from at least two of the gamma radiation detectors 20 to produce a composite response exhibiting a spatial resolution. The composite response in the third step 93 may have one of a spatial resolution that exceeds the spatial resolution of the other gamma radiation detectors 20 individually, a spatial response that is less than the spatial response of the other gamma radiation detectors individually, and a pre-determined spatial response. The third step 93 may include subtracting one response from another response.

Figure 10:
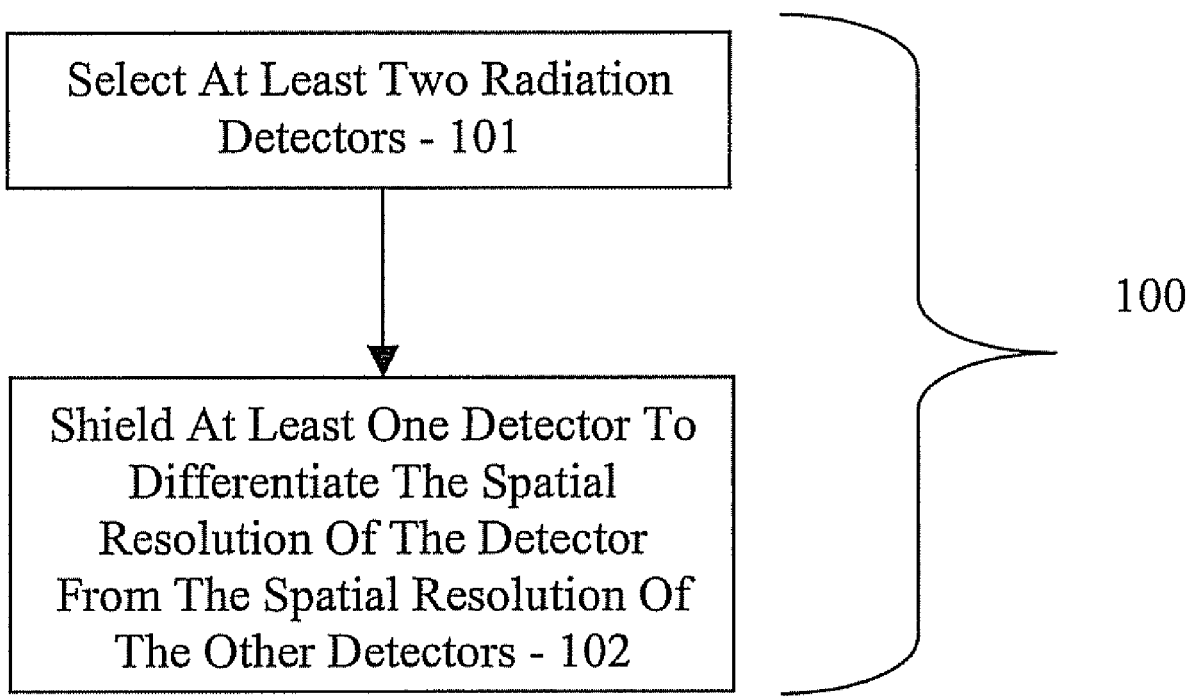
FIG. 10 presents an exemplary method 100 for producing the logging instrument.

FIG. 10 presents an exemplary method 100 for producing the logging instrument 10. A first step 101 calls for selecting at least two gamma radiation detectors 20, each detector 20 including a spatial resolution. The first step 101 may include selecting the gamma radiation detectors 20 with geometries different from each other. The first step 101 may also include placing the detector 20 in a placement geometry that differs from the placement geometry of the other detectors 20. A second step 102 calls for shielding at least one detector 20 to differentiate the spatial resolution of the detector 20 from the spatial resolution of the other detectors 20.

In certain embodiments, the gamma radiation detectors 20 may be disposed in more than one logging instrument 10. In these embodiments the responses from the gamma radiation detectors 20 may be combined to produce the composite response exhibiting a spatial resolution. Using multiple instruments 10 to produce the composite response is considered inherent to the teachings herein and a part of the invention disclosed.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for measuring radiation, the method comprising:
    selecting at least two radiation detectors, each detector comprising a spatial resolution that differs from the spatial resolution of the other detectors wherein the spatial resolution provides for resolving a change in radiation as each detector traverses a borehole;
    measuring the radiation with the detectors; and
    combining a response from at least two of the detectors to produce a composite response exhibiting a spatial resolution for resolving the change in radiation as the detectors traverse the borehole.

2. The method as in claim 1, wherein the composite response exhibits a spatial resolution that exceeds the spatial resolution of each of the detectors individually.

3. The method as in claim 1, wherein the composite response exhibits a pre-determined spatial resolution.

4. The method as in claim 1, wherein measuring comprises measuring during well logging.

5. The method as in claim 1, wherein combining comprises converting the response from at least one detector into a Gaussian curve.

6. The method as in claim 1, wherein combining comprises subtracting one response from another response.

7. The method as in claim 1, wherein combining comprises subtracting one response from another response and summing two responses.

8. The method as in claim 1, wherein combining comprises combining the responses using a statistical algorithm.

9. An instrument comprising:
    at least two radiation detectors, wherein each detector comprises a spatial resolution that differs from the spatial resolution of the other detectors in the instrument, the spatial resolution of each detector providing for resolving a change in radiation as each detector traverses a borehole, the at least two radiation detectors coupled to a device for at least one of storing and combining a response from each of the at least two detectors to produce a composite response, the composite response exhibiting a spatial resolution for resolving the change in radiation as the detectors traverse the borehole.

10. The instrument as in claim 9, wherein the device comprises a processor.

11. The instrument as in claim 9, wherein the device comprises storage media.

12. The instrument as in claim 9, further comprising shielding that at least partially shields one of the detectors.

13. The instrument as in claim 9, further comprising shielding placed at a center portion of at least one detector.

14. The instrument as in claim 9, further comprising shielding placed at a longitudinal end of at least one detector.

15. The instrument as in claim 9, further comprising shielding placed at each longitudinal end of at least one detector.

16. The instrument as in claim 9, further comprising shielding placed at each longitudinal end of at least one detector with no shielding placed at a center portion of the detector.

17. The instrument as in claim 9, further comprising shielding having a non-uniform thickness.

18. A computer program product stored on machine-readable media, the product comprising instructions for measuring radiation, the instructions comprising instructions for:
measuring radiation with at least two radiation detectors, each detector comprising a spatial resolution that differs from the spatial resolution of the other detectors wherein the spatial resolution provides for resolving a change in radiation as each detector traverses a borehole; and
combining a response from each detector to produce at least one composite response exhibiting a spatial resolution for resolving the change in radiation as the detectors traverse the borehole.

19. A method for producing a logging instrument, the method comprising:
selecting at least two radiation detectors, each detector comprising a spatial resolution for resolving a change in radiation as each detector traverses a borehole; and
shielding at least one of the detectors to differentiate the spatial resolution of the detector from the spatial resolution of the other detectors.

20. The method as in claim 19, wherein shielding comprises placing shielding around a center portion of the detector.

21. The method as in claim 19, wherein shielding comprises placing shielding around a longitudinal end of the detector.

22. The method as in claim 19, wherein shielding comprises placing shielding comprising a non-uniform thickness around at least a portion of the detector.

* * * * *